United States Patent Office 3,159,503
Patented Dec. 1, 1964

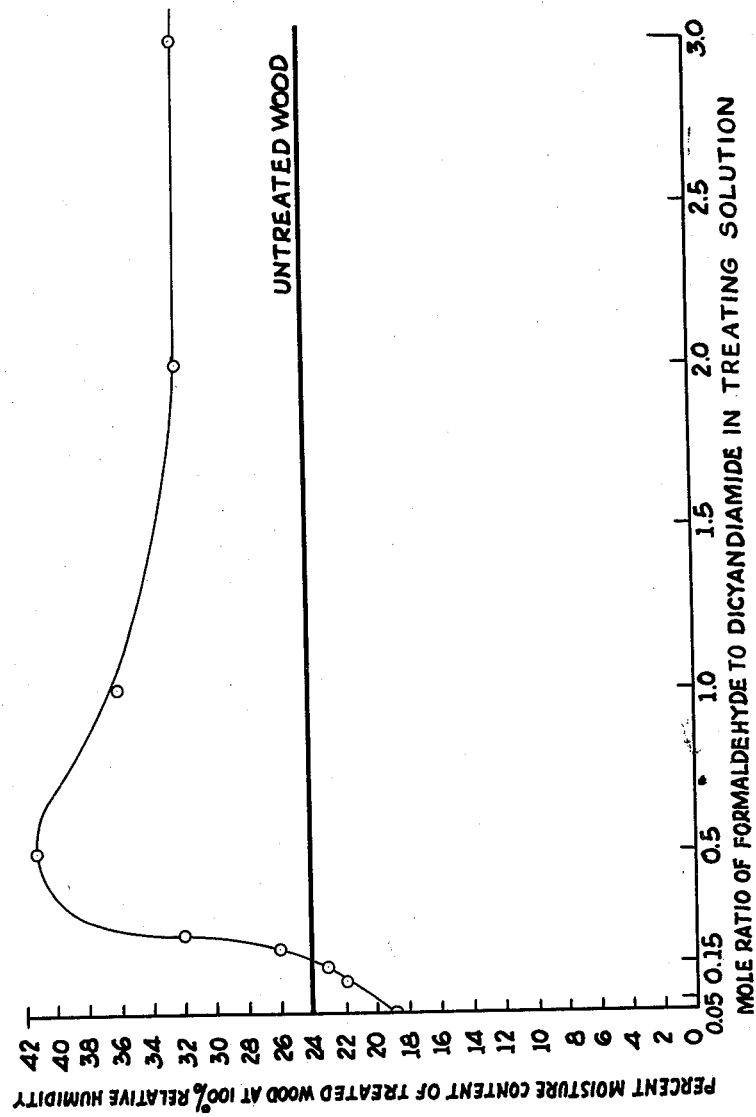

3,159,503
METHOD OF IMPARTING FIRE RETARDANCE TO WOOD AND THE RESULTING PRODUCT
Irving S. Goldstein, Pittsburgh, and William A. Dreher, Verona, Pa., assignors to Koppers Company, Inc., a corporation of Delaware
Filed Oct. 19, 1961, Ser. No. 146,115
3 Claims. (Cl. 117—137)

This invention relates to the chemical treatment of wood. In one specific aspect, it relates to a novel impregnation technique whereby wood is rendered flame retardant and is stabilized against dimensional change. In a further aspect, the invention relates to a leach-resistant, fire-retardant wood product having substantially undiminished impact strength, enhanced dimensional stability and reduced hygroscopicity, and a method for producing such a product.

The wood preserving art is replete with methods to improve one or more of the characteristics of a wood product to make that product more suitable as a construction material. In recent years there has been considerable attention given to the production of flame-retardant wood. Certain impregnation and coating treatments have been developed which retard the burning of wood with varying success, although some of these treatments are undesirable because they adversely affect the impact strength, dimensional stability and the hygroscopicity of the treated wood. It is well known that wood undergoes an increase in dimension upon absorption of moisture from the atmosphere and a contraction when moisture is given up to the atmosphere upon a decrease in humidity. Such swelling and shrinkage are accompanied by warping and checking, which are obviously objectionable when wood is to be used for construction purposes. In providing methods to increase flame retardance of wood, it has thus been necessary for workers in the art to consider (1) the cost of such a treatment, (2) the corrosive nature of the chemicals to be incorporated in the wood, and (3) the effect of the treatment on the mechanical strength and other physical properties of the wood.

In U.S. Patent 2,917,408, issued December 15, 1959, we disclosed and claimed a method for treating wood to produce a flame-retardant wood stabilized against dimensional change and characterized by high impact strength and reduced hygroscopicity. Our claimed method involves impregnating wood with a solution consisting essentially of from 10 to 25% by combined weight of dicyandiamide and phosphoric acid and 90 to 75% by weight water, said dicyandiamide and phosphoric acid being present in a mole ratio of about 1:1 to 2:1, respectively, and heating the impregnated wood to a final temperature between about 70 and 100° C. Although the method is capable of producing a leach resistant, flame-retardant wood of reduced hygroscopicity and substantially undiminished impact strength, in commercial practice, there are certain noticeable drawbacks. The limited solubility of dicyandiamide in water restricts the concentration of flame-retardant ingredients to a maximum of about 25% by combined weight. Although the use of less concentrated solutions, e.g. those having a concentration of 17.5 to 25% by weight, are desirable in many instances, there exist certain applications wherein it would be beneficial to impregnate with a more concentrated solution of ingredients to avoid the relatively high cost of dehydration prior to the curing step. Furthermore, the tendency of dicyandiamide to crystallize from solution often results in "blooming," the deposition of crystalline material on the surface of the wood. Blooming is undesirable not only because it detracts from the physical appearance of the product, but because it is symptomatic of ineffective impregnation with consequent loss in the leach resistance and other beneficial effects of the flame retarding treatment.

Surprisingly, we have found that the formulations of our Patent 2,917,408 can be readily modified in such a manner as to unexpectedly eliminate blooming without adversely affecting the flame retardance, leach resistance, non-hygroscopicity and dimensional stability.

The results obtained using our modified formulation are quite astonishing in view of the known art. Pingree et al. in U.S. Patent 2,488,034 describe the use of aqueous solutions of aldehyde condensates of guanylurea phosphate (the reaction product of dicyandiamide and phosphoric acid) to render plywood, paper and textiles flame retardant. Pingree et al. teach that the amount of aldehyde required for their formulations is two to three moles of aldehyde for each mole of guanylurea phosphate. In spite of the fact that such solutions are effective in treating paper and textiles, it has been well established that when such solutions are applied to wood, the presence of aldehyde adversely affects both the hygroscopicity and the dimensional stability. We have discovered that a small, controlled amount of formaldehyde can be used to modify the impregnating solutions of our patent 2,917,408 in such a way that blooming is unexpectedly controlled and the water-solubility of dicyandiamide is improved without adversely affecting the other beneficial properties imparted to the wood as a result of the impregnation.

It is therefore an object of the present invention to provide a method for treating wood to produce a non-blooming, leach resistant, flame-retardant wood which has reduced hygroscopicity and improved dimensional stability. It is a further object to provide a leach resistant flame-retardant wood suitable for exterior construction.

In accordance with the invention, wood is impregnated with a solution of dicyandiamide and phosphoric acid containing a carefully controlled minor portion of formaldehyde, and the impregnated product is thereafter dried and cured by heating it to a temperature of 70–100° C.

The criticalness of the amount of formaldehyde present in the impregnating solutions of the invention can be better understood by referring to the accompanying drawing, which is a graphic illustration of the effect of the mole ratio of formaldehyde in the impregnating solution on the moisture content of the treated wood at 100% relative humidity.

The impregnating solution consists essentially of 10 to 50% by weight of the combined phosphoric acid, dicyandiamide and formaldehyde and 90 to 50% by weight water. Solutions containing less than about 10% by weight of the combined ingredients do not impart sufficient fire retardance to the wood. Moreover, such solutions generally fail to provide the enhanced dimensional stability obtainable by the process of the invention. Solutions having a weight percent concentration of three active ingredients of greater than 50% are somewhat unstable; hence they are ineffective unless used immediately. Although the active solids can be redissolved by heating with suitable agitation, this lack of storage stability makes the use of such solutions economically unattractive.

The mole ratio of dicyandiamide to phosphoric acid in the impregnating solution ranges from about 1:1 to 2:1. If this mole ratio is less than about 1:1, the treating solution tends to be too strongly acidic and will thus impair the treated product. It is not particularly desirable to use solutions having mole ratios greater than about 2:1 because of the limited solubility of the dicyandiamide in water. Although the use of formaldehyde according to the present invention enhances the water-solubility of dicyandiamide, this increase in solubility is more effectively used in preparing solutions of greater solids concentration. Furthermore, the reduction in the relative amount of phosphoric acid present in a formulation tends to diminish the effectiveness of the impregnator as a fire retardant.

The amount of formaldehyde used in the impregnator ranges between 0.05 and 0.15 mole per mole of dicyandiamide. If the amount of formaldehyde is less than 0.05 mole the solubility of the dicyandiamide is not enhanced; thus it is not possible to prepare the more concentrated soluitons of active ingredients and the blooming which tends to occur as a result of the impregnation treatment is not eliminated. If the amount of formaldehyde is greater than 0.15 mole, the treated wood becomes considerably more hygroscopic than the untreated wood, and the resulting product is subject to considerable warping and checking.

Referring to the drawing, the abscissa of the graph represents the mole ratio of formaldehyde to dicyandiamide in dicyandiamide-phosphoric acid solutions containing 20% by combined weight dicyandiamide and phosphoric acid. The ordinate is the percent moisture content of the impregnated wood at 100% relative humidity, the moisture content of the untreated control specimen being 24%. It is seen that impregnation in the absence of formaldehyde (according to U.S. Patent 2,917,408 of Goldstein and Dreher) results in a wood product having a moisture content at 100% relative humidity lower than that of untreated wood. Upon addition of up to 0.15 mole of formaldehyde per mole of dicyandiamide to the impregnator, the resulting product is still less hygroscopic than untreated wood. With an amount of formaldehyde only very slightly in excess of 0.15 mole, the moisture content increases very sharply, up to about 41%, thus providing a wood product which is considerably inferior with respect to hygroscopicity. After 1 mole of formaldehyde has been added to the impregnating solution, the moisture content levels off to about 32-36%, which represents up to a 50% increase when compared with the moisture content of an untreated specimen. Furthermore, as will be shown in the examples that follow, the dimensional stability of the wood product is markedly reduced. The data upon which the graph of the drawing is based is shown in Example I.

Dicyandiamide and phosphoric acid react in a heated aqueous solution to form guanylurea phosphate. As explained in our Patent 2,917,408, the components of the impregnator, the dicyandiamide and phosphoric acid, may be pre-reacted by combining them at elevated temperatures in aqueous solution. The pre-reacted solutions offer a slight advantage in that they are of lower acidity and tend thereby to insure no degradation of the wood during treatment. Since the addition of formaldehyde to the aqueous solution of dicyandiamide and phosphoric acid is exothermic, the formaldehyde addition and pre-reaction of the dicyandiamide and phosphoric acid can be accomplished concomitantly.

The required amount of formaldehyde is conveniently added according to the following procedure: (1) heat the dicyandiamide-phosphoric acid solution to a temperature between about 55 and 65° C., (2) add the formaldehyde solution, conveniently as Formalin (commercially available 37% formaldehyde), over a period of about 15 minutes, and (3) maintain the reaction temperature at about 55 to 70° C. for an additional 30 to 60 minute period.

The method of formaldehyde addition is particularly important when preparing the more concentrated solutions of the invention. The dicyandiamide-phosphoric acid-formaldehyde solution must be heated for a time sufficient to achieve maximum solubility of the dicyandiamide. If heating is continued for too long a period, there is a strong tendency for the solids to precipitate from solution. If insufficient reaction takes place or if heating is continued for too short a period, the resulting solutions are not storage stable for any length of time at ambient temperature. The preparation of storage stable solutions is obviously desirable because of the increased cost involved in an additional heating and agitation step prior to use.

There has been considerable interest shown in the use of the impregnating solutions of our Patent 2,917,408 as impregnators for wood fiber products, particularly particle board, hardboard and insulating board. The most frequently mentioned criticism of such use, the limited solubility of the formulation resulting in inability to get enough fire-retardant chemical in fibers that have been saturated previously with water, has been overcome by the present invention.

Impregnation of the wood is conveniently accomplished by a full cell cycle. The object of the full cell process is to fill the capillary structure of the wood with the treating solution. This is accomplished by subjecting the treating reactor, containing the wood to be treated, to a vacuum of about 22-26" of mercury for a period of time ranging from about 15 minutes to an hour. The reactor is then filled with treating solution and subjected to a pressure of about 125-200 p.s.i. at 25-100° C. for about 2 to 8 hours. The larger and more refractory pieces of wood require either a longer vacuum period, or longer pressure period, or perhaps both. For most woods, a 30 minute vacuum of 25-26" of mercury followed by a 4 to 8 hour pressure period of 160 p.s.i. at 50-60° C. is adequate.

Other standard impregnation techniques known to the art can also be used, depending, of course, on the physical nature of the wood. For example, impregnation may be accomplished by soaking, by vacuum impregnation at atmospheric pressure, by alternate application of pressure and vacuum or by the "empty cell" process. The "empty cell" process involves forcing the impregnating solution under pressure into wood containing air. The back pressure, caused by compressing the air within the wood, forces out part of the solution when the pressure is released.

After the impregnation treatment, the wood is placed in a drying oven or kiln to dry and cure the treated wood. Wood is dried in a conventional manner to a fairly low moisture content at temperatures between about 40°-70° C. and is thereafter cured by heating it to temperatures between 70° C. and 100° C. Curing temperatures above 100° C. have a definite adverse effect. Most woods, unless heated in very thin sections for short periods of time, cannot withstand a curing temperature higher than this without impairment of mechanical strength. If the treated wood is cured at a temperature below about 70° C., the dicyandiamide and phosphoric acid do not become fixed within the cellular structure of the wood, and hence they are leached away upon exposure to water. The resulting product is obviously not one having non-leachable flame-retardant properties. Moreover, the dimensional stability of such wood is not improved. The curing temperatures of the method of the present invention offer particular advantage in that commercial dry kilns are designed to operate at such temperatures.

Often it is convenient to effect the initial curing at temperatures of about 70° C. and the final curing at temperatures of about 90° C. The curing cycle selected will vary with the size and the properties of the pieces of wood to be treated. For example, most woods can be suitably cured using an initial cure of 15-25 hours at about 70° C. followed by a final cure of from 4-12 hours at about 90° C. The curing process should be as rapid as possible within the prescribed temperature limits to prevent slight degradation by unbound phosphoric acid. As the curing temperature is decreased, the curing time must be increased. The curing temperatures discussed hereabove refer to the temperature of the wood itself, rather than the temperature of the surrounding atmosphere in which the wood is heated.

Our invention is further illustrated by the following examples:

EXAMPLE I

Aqueous treating solutions containing 20% by combined weight of dicyandiamide and phosphoric acid and containing varying amounts of formaldehyde were prepared and used for treating ponderosa pine wafers that would attain moisture equilibrium quickly. After the treatment the wafers were oven dried to provide a dry weight on which to base moisture measurements. The specimens were then placed in a sealed container over a reservoir of distilled water. Thus a 100% relative humidity environment was created when water evaporated and saturated the air surrounding the specimens. After about a month of equilibration, it was found that specimens had picked up as much moisture as they would attract. A second weighing, at the equilibrated condition, allowed calculation of moisture content of the respective sets of specimens. Results are shown hereunder in Table I and are presented graphically in the drawing.

Table I

MOISTURE CONTENTS ATTAINED IN 100% RELATIVE HUMIDITY ATMOSPHERE BY PONDEROSA PINE WOOD TREATED WITH 20% SOLUTIONS OF DICYANDIAMIDE-PHOSPHORIC ACID-FORMALDEHYDE CONTAINING VARYING AMOUNTS OF FORMALDEHYDE

| Treating Solutions | Moisture Content at Equilibrium in 100% Relative Humidity Chamber, Percent of Oven Dry Weight [1] |
|---|---|
| Untreated Wood | 24 |
| 20% Dicyandiamide-Phosphoric Acid—No Formaldehyde | 20 |
| 20% Dicyandiamide-Phosphoric Acid-Formaldehyde, 0.10 Mole Formaldehyde | 22 |
| 20% Dicyandiamide-Phosphoric Acid-Formaldehyde, 0.15 Mole Formaldehyde | 23 |
| 20% Dicyandiamide-Phosphoric Acid-Formaldehyde, 0.20 Mole Formaldehyde | 26 |
| 20% Dicyandiamide-Phosphoric Acid-Formaldehyde, 0.25 Mole Formaldehyde | 35 |
| 20% Dicyandiamide-Phosphoric Acid-Formaldehyde, 0.50 Mole Formaldehyde | 41 |
| 20% Dicyandiamide-Phosphoric Acid-Formaldehyde, 1 Mole Formaldehyde | 36 |
| 20% Dicyandiamide-Phosphoric Acid-Formaldehyde, 2 Moles Formaldehyde | 32 |
| 20% Dicyandiamide-Phosphoric Acid-Formaldehyde, 3 Moles Formaldehyde | 32 |

[1] Based on weight of treated product except for untreated controls.

EXAMPLE II

Ponderosa pine dimensional stability specimens were impregnated full cell with one of the following solutions, (1) 25% dicyandiamide-phosphoric acid with no formaldehyde, (2) 50% dicyandiamide-phosphoric acid-formaldehyde with 0.1 mole of formaldehyde, or (3) 50% dicyandiamide-phosphoric acid-formaldehyde containing 2 moles of formaldehyde. After treatment the specimens were dried and cured to an oven dry condition at 105° C. They were weighed and measured in the tangential dimension while oven dry and were then open stacked in a room maintained at 70% relative humidity. After equilibrium had been attained in this environment they were moved to a sealed container over distilled water where a condition of 100% relative humidity was provided. After approximately a month in this chamber the specimens were removed and weighed and measured again. Calculated moisture content and dimensional stability values obtained from these readings are listed in Table II.

Table II

DIMENSIONAL STABILITY AND MOISTURE CONTENT OF PONDEROSA PINE WOOD TREATED WITH 50% 0.1 MOLE DICYANDIAMIDE-PHOSPHORIC ACID-FORMALDEHYDE, 50% 2 MOLES DICYANDIAMIDE-PHOSPHORIC ACID-FORMALDEHYDE OR 25% DICYANDIAMIDE-PHOSPHORIC ACID SOLUTION AND EXPOSED AT 70% AND 100% RELATIVE HUMIDITY

| Treatment | Dimensional [1] Stability at 70% R.H., Percent | Dimensional [1] Stability at 100% R.H., Percent | Moisture [2] Content at 70% R.H., Percent | Moisture [2] Content at 100% R.H., Percent |
|---|---|---|---|---|
| Untreated Control | | | 9.4 | 21.9 |
| 25% Dicyandiamide-Phosphoric Acid, No Formaldehyde | 38 | 44 | 5.9 | 19.6 |
| 50% Dicyandiamide-Phosphoric Acid-Formaldehyde, 0.1 Mole Formaldehyde | 35 | 51 | 5.5 | 20.6 |
| 50% Dicyandiamide-Phosphoric Acid-Formaldehyde, 2 Moles Formaldehyde | −42 | −102 | 7.7 | 28.8 |

[1] Expressed as percentage reduction in tangential swelling (from oven dry dimension) compared with that experienced by untreated controls. Negative values indicate swelling greater than that of controls.
[2] Based on oven dry weight of treated product.

EXAMPLE III

An experiment was designed to measure the fire retardant efficiency of a formulation of the invention containing a 0.15 mole addition of formaldehyde in comparison with a 1:1 molar combination of dicyandiamide and phosphoric acid prepared according to the teachings of our Patent U.S. 2,917,408. Untreated specimens were used as a control. The two formulations were mixed to contain 20% solids, using the proportions listed in Table III. Both solutions were pre-reacted by heating to 90° C. for about five minutes, after which they were allowed to cool to the 50° C. treating temperature.

Five southern pine fire-tube specimens ⅜ x ¾ x 40 inches long were cut for use with each series of tests. The wood specimens were placed in an experimental treating cylinder designed for pressure impregnation. The 20% treating solution was poured over the wood specimens, which were prevented from floating by the weight of steel restraining bars. A 15 minute vacuum of 26 inches of mercury was applied to the wood. Then a pressure of 150 p.s.i. of air pressure was applied for a period of four hours at a solution temperature of 50° C. This procedure was repeated to prepare specimens for each of the two formulations being tested.

The treated wood specimens in their wet condition were next placed in a small experimental dry kiln where they were heated for 24 hours at 65° C. dry bulb temperature and 55° C. wet bulb temperature. They were then heated for four hours at 93° C. dry bulb with no wet bulb control (ambient humidity prevailing).

All treated specimens and a set of matched untreated control specimens were next equilibrated in a room maintained at 23° C. and 50% relative humidity. After moisture equilibrium had been attained, the specimens were individually tested in a so-called "fire tube" apparatus, according to American Society for Testing Materials Standard E69-50. Averaged results for these tests are presented in Table III.

*Table III*

RESULTS OF ASTM FIRE TUBE TESTS (STANDARD E69-50) ON SOUTHERN PINE SPECIMENS PRESSURE IMPREGNATED WITH TWO FIRE RETARDANT SOLUTIONS

| Formulation of Treating Solution | Fire Tube [1] Weight Loss, Percent | After-Flame,[1] Seconds | After-glow,[1] Seconds |
|---|---|---|---|
| 20% 0.15:1:1 Molar Ratios of Formaldehyde:Dicyandiamide:Phosphoric Acid: 9.1 Parts Dicyandiamide 12.3 Parts 85% Phosphoric Acid 1.2 Parts 40% Formaldehyde Solution 77.4 Parts Water | 17.2 | 0 | 0 |
| 20% 1:1 Molar Ratios of Dicyandiamide:Phosphoric Acid: 9.2 Parts Dicyandiamid 12.7 Parts 85% Phosphoric Acid 78.1 Parts Water | 16.5 | 0 | 0 |
| Untreated Pine Controls | 84.8 | 32 | 124 |

[1] Values reported are averages of five specimens.

The values reported in Table III indicate that the addition of the 0.15 mole of formaldehyde does not result in any significant reduction in the fire retardance imparted to wood. Both sets of test results indicate an excellent fire retardant effect on the wood.

We claim:

1. Method of treating wood to impart thereto fire retardance without increasing the hygroscopicity and adversely affecting the dimensional stability comprising impregnating wood with a solution consisting essentially of from 10 to 50% by combined weight of dicyandiamide, phosphoric acid and formaldehyde and 90 to 50% by weight water, said dicyandiamide and phosphoric acid being present in a mole ratio of about 1:1 to 2:1, respectively, and said formaldehyde being present in an amount of 0.05 mole to 0.15 mole based on the number of moles of said dicyandiamide, and heating the impregnated wood to a final temperature between about 70 and 100° C., thereby producing a flame-retardant, dimensionally stable wood of reduced hygroscopicity.

2. The product of the method of claim 1.

3. Method of treating wood fibers to impart thereto fire retardance without increasing the hygroscopicity and adversely affecting the dimensional stability comprising impregnating wood fibers with a solution consisting essentially of from 10 to 50% by combined weight of dicyandiamide, phosphoric acid and formaldehyde and 90 to 50% by weight water, said dicyandiamide and phosphoric acid being present in a mole ratio of about 1:1 to 2:1, respectively, and said formaldehyde being present in an amount of 0.05 mole to 0.15 mole based on the number of moles of said dicyandiamide, and heating the impregnated wood to a final temperature between about 70 and 100° C., thereby producing a flame-retardant, dimensionally stable wood of reduced hygroscopicity.

References Cited by the Examiner

UNITED STATES PATENTS

| | | | |
|---|---|---|---|
| 1,837,150 | 12/31 | Dreyfus et al. | 117—136 XR |
| 2,262,634 | 11/41 | Cobbs | 117—136 |
| 2,530,261 | 11/50 | Morton et al. | 117—137 XR |
| 2,632,741 | 3/53 | Eckert | 117—137 XR |
| 2,917,408 | 12/59 | Goldstein et al. | 117—137 XR |

WILLIAM D. MARTIN, *Primary Examiner.*

RICHARD D. NEVIUS, *Examiner.*